United States Patent
Krause et al.

(10) Patent No.: US 10,115,061 B2
(45) Date of Patent: Oct. 30, 2018

(54) MOTIF RECOGNITION

(71) Applicants: Lee S. Krause, Indialantic, FL (US); Craig T. Hagan, Melbourne Beach, FL (US); Bruce R. McQueary, Indialantic, FL (US); James B. Schneider, Melbourne, FL (US)

(72) Inventors: Lee S. Krause, Indialantic, FL (US); Craig T. Hagan, Melbourne Beach, FL (US); Bruce R. McQueary, Indialantic, FL (US); James B. Schneider, Melbourne, FL (US)

(73) Assignee: Securboration, Inc., Melbourne, FL (US)

( * ) Notice: Subject to any disclaimer, the term of this patent is extended or adjusted under 35 U.S.C. 154(b) by 0 days.

(21) Appl. No.: 15/137,973

(22) Filed: Apr. 25, 2016

(65) Prior Publication Data
US 2016/0239763 A1 Aug. 18, 2016

Related U.S. Application Data

(63) Continuation of application No. 14/221,251, filed on Mar. 20, 2014, now Pat. No. 9,372,929.

(60) Provisional application No. 61/803,547, filed on Mar. 20, 2013.

(51) Int. Cl.
G06F 17/00 (2006.01)
G06N 99/00 (2010.01)
G06F 17/30 (2006.01)

(52) U.S. Cl.
CPC ....... *G06N 99/005* (2013.01); *G06F 17/3053* (2013.01); *G06F 17/3064* (2013.01); *G06F 17/30153* (2013.01); *G06F 17/30648* (2013.01); *G06F 17/30867* (2013.01)

(58) Field of Classification Search
CPC .......... G06F 17/30153; G06F 17/3053; G06F 17/3063; G06F 17/30; G06F 17/3064
USPC .................................................. 707/600–899
See application file for complete search history.

(56) References Cited

U.S. PATENT DOCUMENTS

| | | | |
|---|---|---|---|
| 2010/0023506 A1* | 1/2010 | Sahni | G06F 17/30876 707/E17.014 |
| 2011/0072052 A1* | 3/2011 | Skarin | G06Q 10/10 707/794 |
| 2011/0093449 A1 | 4/2011 | Belenzon et al. | |
| 2012/0173562 A1 | 7/2012 | Zhu | |

\* cited by examiner

Primary Examiner — Isaac M Woo
(74) Attorney, Agent, or Firm — Danielson Legal LLC

(57) ABSTRACT

Methods and systems for motif recognition in graph sets. Distribution scores comparing the canonical representations of a compressed graph in the set of graphs versus the canonical representations of a compressed graph in a reference graph are used to determine the significance of the compressed graph.

14 Claims, 13 Drawing Sheets

FIG. 4

Algorithm 1 LSBGREEDY
1: input: $\lambda, \alpha_t$
2: for $t = 1, \ldots, T$ do
3: $\quad M_t \leftarrow \lambda I_d + \sum_{\tau=1}^{t-1} \sum_{i=1}^{L} \Delta_\tau^{(i)} (\Delta_\tau^{(i)})^\top$ // covariance matrix
4: $\quad b_t \leftarrow \sum_{\tau=1}^{t-1} \sum_{i=1}^{L} r_\tau^{(i)} \Delta_\tau^{(i)}$ // aggregate feedback so far
5: $\quad w_t \leftarrow M_t^{-1} b_t$ // linear regression using previous feedback as training data
6: $\quad A_t \leftarrow \emptyset$
7: $\quad$ for $i = 1, \ldots, L$ do
8: $\quad\quad \forall a \in \mathcal{A}_t \setminus A_t^{(i)}: \mu_a \leftarrow w_t^\top \Delta(a|A_t)$ // compute mean estimate of utility gain
9: $\quad\quad \forall a \in \mathcal{A}_t \setminus A_t^{(i)}: c_a \leftarrow \alpha_t \sqrt{\Delta(a|A_t)^\top M_t^{-1} \Delta(a|A_t)}$ // compute confidence interval
10: $\quad\quad$ set $a_t^{(i)} \leftarrow \arg\max_a (\mu_a + c_a)$, $A_t \leftarrow A_t \cup \{a_t^{(i)}\}$ // select article with highest upper confidence bound
11: $\quad\quad$ store $\Delta_t^{(i)} \leftarrow \Delta(a_t^{(i)}|A_t^{(i-1)})$
12: $\quad$ end for
13: $\quad$ recommend articles $A_t$ in the order selected, and observe rewards $r_t^{(1)}, \ldots, r_t^{(L)}$ for each slot
14: end for

MOTIF RECOGNITION

CROSS-REFERENCE TO RELATED APPLICATIONS

The present application claims the benefit of U.S. provisional application no. 61/803,547, filed on Mar. 20, 2013, and pending U.S. utility patent application Ser. No. 14/221,251, filed on Mar. 20, 2014, and issued as now U.S. Pat. No. 9,372,929, on Jun. 21, 2016, the entire disclosure of each of which is incorporated by reference as if set forth in its entirety herein.

STATEMENT REGARDING FEDERALLY SPONSORED RESEARCH OR DEVELOPMENT

This invention was made with government support under Air Force Research Laboratory Contract No. FA8750-12-C-0210. The government may have certain rights in the invention.

FIELD OF THE INVENTION

The present invention is directed toward the field of social network analysis (SNA) and, in particular, to noise reduction and detecting relationships between users within social media data streams.

BACKGROUND OF THE INVENTION

Social network analysis focuses on the application of network theory to social relationships. Individuals in the network can be thought of as nodes and relationships between those individuals can be thought of as links.

Many popular uses of the Internet result in the generation of massive amounts of data that effectively document, explicitly or implicitly, individuals and their relationships to each other. Due to the size of this data set and its constantly-changing nature, it is difficult to manually analyze this data. It would be desirable to have automated methods and systems that can process this data into a social network with little manual intervention and guidance.

SUMMARY OF THE INVENTION

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

The present invention represents a practical solution to SNA link detection. One object of the present invention is to discover implicit and explicit networks in social media and discern meaning. In one embodiment, the present invention is a combination of semantic processing, term recommendation, data acquisition, noise reduction, and link detection algorithms employed within a computing framework. One embodiment of the present invention uses the Linear Sub-Modular Bandits Greedy algorithm (LSB) combined with multi-dimensional feature analysis. That feature analysis may consider values for singular value decomposition, modified Katz index, and side information such as user metadata associated with each person or network node.

In one aspect, the present invention concerns a method for network analysis. At least one search term is received through an interface in, e.g., a query or document. A recommendation engine is queried to retrieve at least one additional term related to the at least one search term. The at least one additional term is provided through the network interface. A data store is queried to retrieve information relating to the at least one search term and the at least one additional term. The retrieved information is provided through the network interface. Feedback on the relevance of the retrieved information is received through the network interface. The processor identifies influential nodes and links therebetween in the retrieved information using the received feedback.

In one embodiment, the recommendation engine comprises information concerning third party usage of the at least one search term provided by the user or extracted from a user provided document and the at least one additional term. In another embodiment, the data store comprises information from social media and other data sources including information relating to the at least one search term and the at least one additional term. In still another embodiment, the feedback includes human review of the relevance of the retrieved information. In yet another embodiment, identifying influential nodes and links therebetween includes ranking the nodes and links based on the received feedback. In another embodiment, identifying influential nodes and links includes identifying influential nodes and links using at least one of the Linear Submodular Bandits algorithm and the Latent Dirichlet Allocation. In one embodiment, identifying at least one additional term includes identifying at least one additional term utilizing at least one of collaborative filtering, cosine similarity, and a user model.

In one embodiment, the method includes iterating substantially in real time the steps of receiving feedback on the relevance of the retrieved information and identifying influential nodes and links therebetween in the retrieved information using the received feedback. In another embodiment, the method includes ranking the identified nodes in terms of influence. In still another embodiment, the method includes presenting a real time user updateable graphical depiction of the influential nodes and the links therebetween using a display.

In another aspect, the present invention concerns a system for network analysis. The system includes an interface, a processor in communication with the interface, a recommendation engine in communication with the processor, and a data store in communication with the processor. The interface is configured to receive at least one search term. The processor is configured to retrieve from the recommendation engine at least one additional term related to the at least one search term, and to retrieve from the data store information relating to the at least one search term and the at least one additional term. The interface is further configured to provide the at least one additional term and the retrieved information, and to receive feedback on the relevance of the retrieved information. The processor is further configured to identify influential nodes and links therebetween in the retrieved information using the received feedback.

In one embodiment, the recommendation engine includes information concerning third party usage of the at least one search term and the at least one additional term. In another embodiment, the data store includes information from social media sources including information relating to the at least one search term and the at least one additional term. In still another embodiment, the processor identifies influential nodes and links therebetween by ranking the nodes and links based on the received feedback. In yet another embodiment, the recommendation engine identifies at least one additional term utilizing at least one of collaborative filtering, cosine similarity, and a user model. In one embodiment, the processor identifies influential nodes and links using at least one of the Linear Submodular Bandits algorithm, and the Latent Dirichlet Allocation.

In one embodiment, the system includes a display in communication with the processor and configured to present a graphical depiction of the influential nodes and the links therebetween. In another embodiment, the processor is configured to identify influential nodes and links therebetween in the retrieved information using the received feedback substantially in real time.

In yet another aspect, the present invention concerns a method for motif recognition in a set of graphs derived from a collection of noise reduced data. An uncompressed graph from the set of graphs is compressed, and the compressed graph is appended to a similar graph from the set of graphs. The number of canonical representations of the compressed graph in the set of graphs is counted to yield a first count. A random graph equal in size to the uncompressed graph is generated from the noise reduced data, and the number of canonical representations of the compressed graph in the random graph is counted to yield a second count. A distribution score is computed utilizing at least the first count and the second count to determine the significance of the compressed graph.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following Figures in which:

FIG. 4 is a pseudo code implementation of the LSB Greedy Algorithm;

In the drawings, like reference characters generally refer to corresponding parts throughout the different views. The drawings are not necessarily to scale, emphasis instead being placed on the principles and concepts of operation.

DETAILED DESCRIPTION OF THE INVENTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

One object of the present invention is to accelerate the processing of large social media streams in response to time-critical Intelligent Problems (IPs) or Priority Intelligence Requirements (PIRs). Embodiments of the present invention are designed to provide link and network identification within overwhelming and noisy social media data streams (e.g., Twitter, Reddit, Facebook, etc.).

Figure 1:
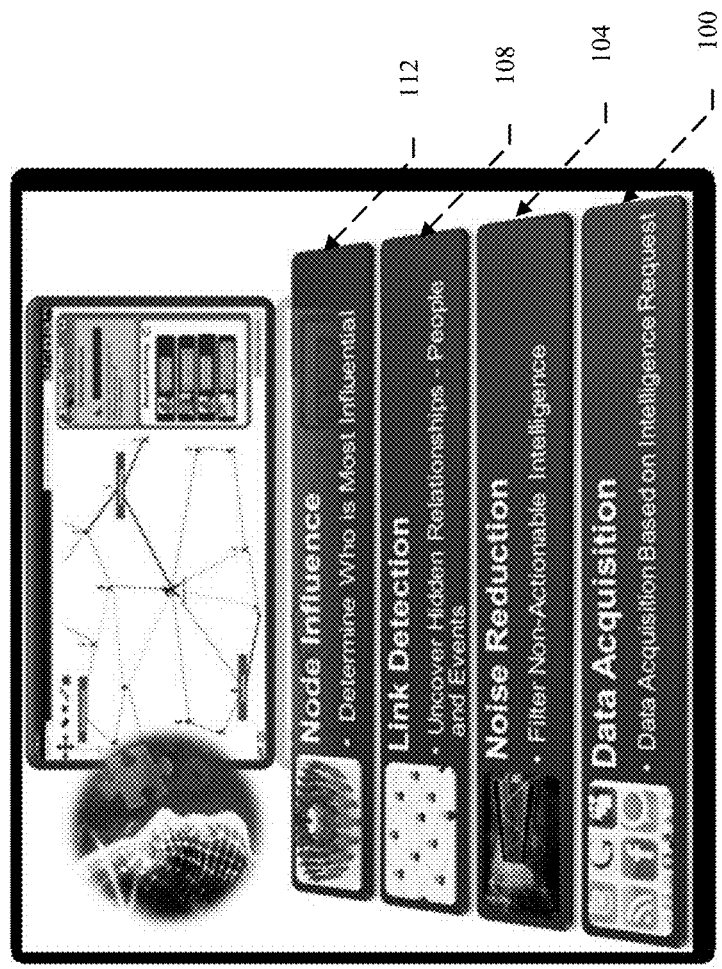
FIG. 1 is a block diagram illustrating an overview of the concept of operations for an embodiment of the present invention.

Manually extracting links and identifying networks is often impractical in big data environments. Embodiments of the present invention do this automatically for both implicit and explicit network relations on behalf of the user. With reference to FIG. 1, the overall inventive architecture employs a pipeline of algorithms for data acquisition 100, noise reduction 104, link detection 108, node influence 112, and link prediction (not shown). One embodiment of the present invention utilizes a framework to perform calculations on the graph generated from the social media data in a parallel computing environment.

Figure 2:
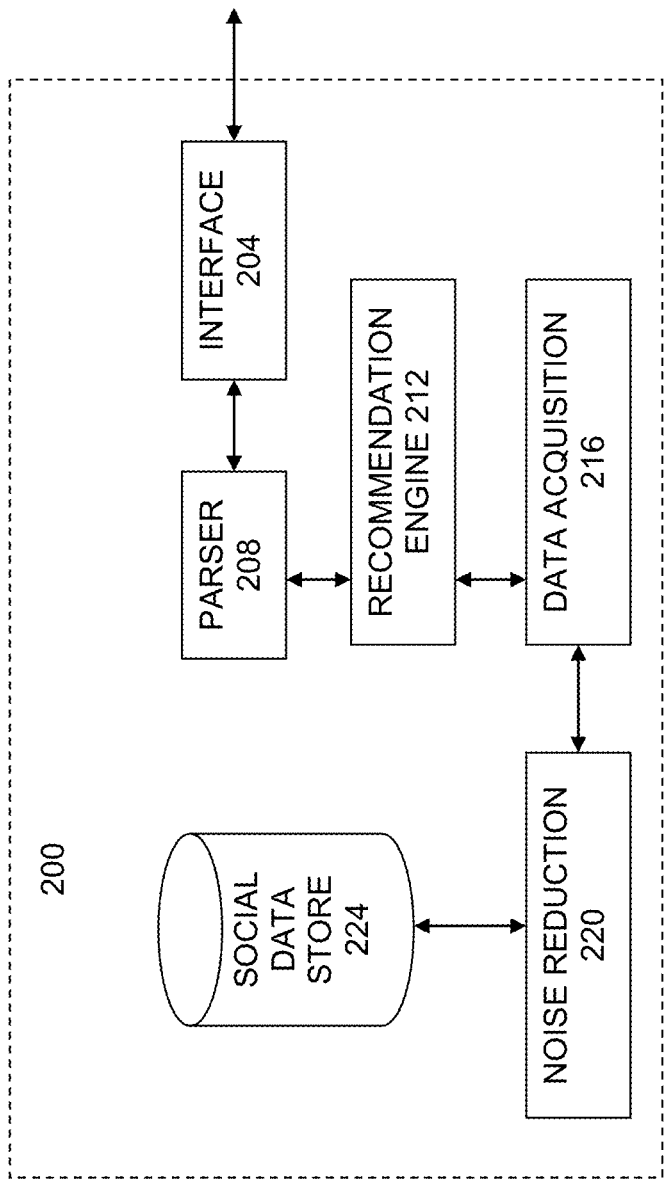
FIG. 2 is a block diagram of one embodiment of a system in accord with the present invention.
Figure 3:
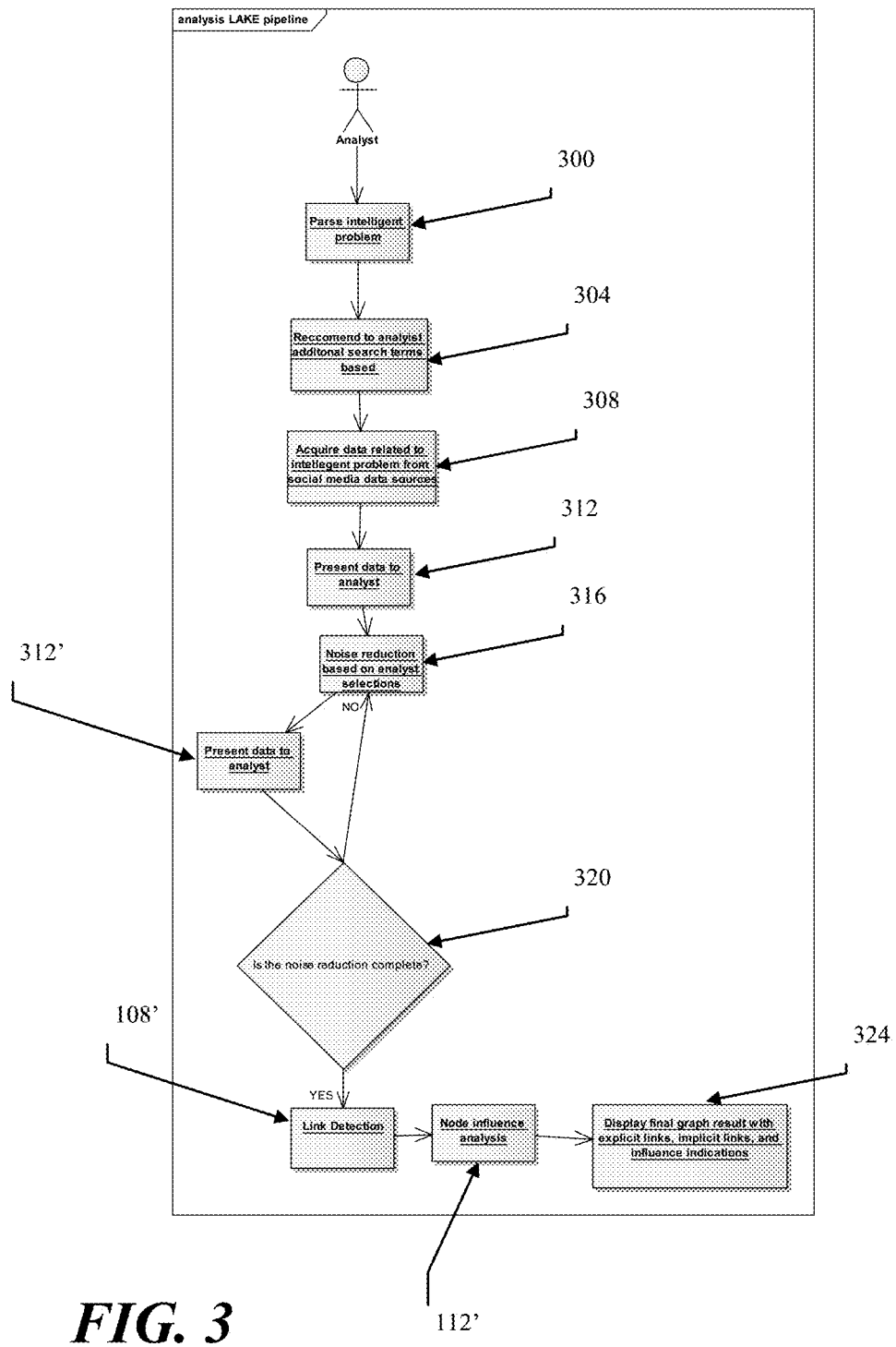
FIG. 3 is a block diagram illustrating the architecture and data flow through an embodiment of the present invention.

With reference to FIGS. 1-3, the first step in the inventive process is the data acquisition stage 100 in which the user submits a question or a document to the system via an interface 204. This submission is parsed for essential information 300, such as the terms used in the submission, using a processor that is configured to operate as a parser 208 and the essential information is then sent to a search term recommendation engine 212.

The search term recommendation engine 212 uses recommendation algorithms to provide the analyst with additional search terms 304 relevant to their initial query based on the use of the search terms and other essential information by users of social media. In one embodiment, the recommendation algorithms may classify the essential information into a taxonomy and use the classification to find other terms relevant to the classified information. In other embodiments, the algorithms are known recommendation algorithms such as collaborative filtering and cosine similarity. In yet another embodiment, the algorithms generate a model of a social media user who uses specific keywords, and using that model determines other keywords that such a user would be likely to use. For example, a query for "marijuana" may result in recommended terms such as "weed," "mary jane," etc. The data acquisition algorithm 216 gathers information related to the IP 308 from social media and other data sources.

The noise reduction step 104 distills the torrent of data available from social media data store 224 down to the results that are going to be relevant to the IP. The noise reduction stage 104 begins by presenting examples of the data retrieved from the store 224 to the user 312 who then decides which data examples are relevant to the IP. The results of this initial evaluation step are provided to noise reduction algorithms 220 to further refine the results 316.

Noise reduction 104 can be accomplished by clustering all of the information into major topic areas using a variation of the Latent Dirichlet Allocation (LDA) algorithm. However, this process is computationally expensive when used to identify all the subsequent topics that can be found in a natural language text fields. To get around the computational cost of using LDA, certain embodiments of the present invention employ the linear submodular bandits (LSB) algorithm depicted in pseudocode in FIG. 4. Use of LSB instead of LDA allows for a Pareto optimal solution while having the ability to run in a near real-time or online fashion. LSB combines the upper confidence bounded tree algorithm with the concept of sub-modularity. This provides a computationally simple process that is substantially accurate in noise reducing ability.

The high performance provided by the use of LSB allows the noise reduction step 104 to be interactive with the user. The LSB algorithm takes the initial feedback from the user 316 and creates a linear regression from that feedback to create a weighted matrix for all articles, both seen and unseen. This matrix is then calculated using the game theory concept of utility in order to decide which linear regression is most likely to be correct. These results are presented to the user 312' who makes a decision as to what articles are relevant to the IP and the process repeats itself; this allows a variation of the LSB greedy algorithm to display efficiencies not possible with a fully computational process. The ability of the system to provide interactive network analysis, receiving feedback from users on the output of the system and then revising those results in substantially real-time, is believed to be unique and is provided by the use of the noise reduction process to cull the initial data set into something that is tractable without a significant reduction in relevant results.

Once noise reduction 104 is complete 320 the data is subjected to the link analysis stage 112. Embodiments of the present invention find relationships that a user may not identify unaided due to the sheer volume of data at issue.

Certain embodiments of the invention utilize online learning algorithms that can significantly improve performance over traditional offline methods without any significant loss of precision or recall. Online learning algorithms assume that all data is not available at processing time and allow for incremental updates of relationships and links as new data comes into the system. In contrast, offline learning processes assume that all data is present at the initial run and no subsequent processing is required. Online processing allows the handling of larger datasets than the offline learning method and introduces the ability to process streaming live data directly from large, dynamic data sources such as Twitter or Facebook. This increase in the amount of data accessible to the online learning methods allows a larger increase in precision and recall. Examples of online machine learning platforms suited for use in various embodiments of the present invention include Vowpal Wabbit, Apache Mahout, and Jubatus.

Figure 5:
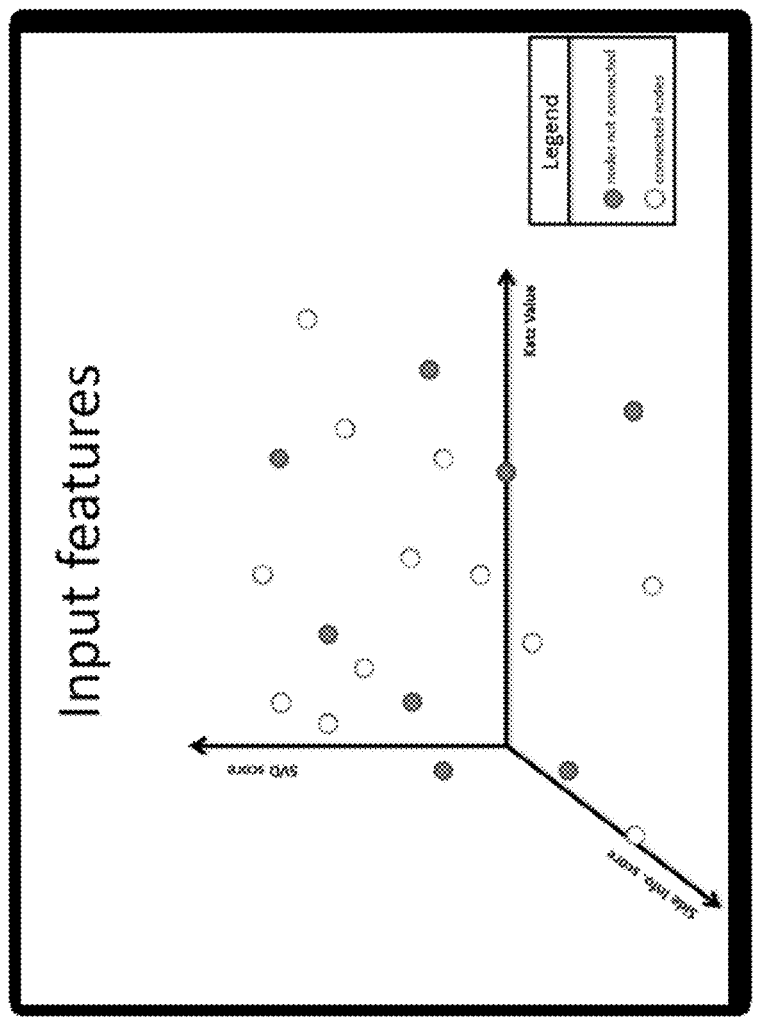
FIG. 5 is a multi-dimensional graph representing a decision space for an individual user, i.e., a node in a social media network.

As depicted in FIG. 5, online link detection 108 uses multi-dimensional feature analysis with each node plotted along three axes, one axis for each of Singular Value Decomposition, Modified Katz Index, and Side Info. The red circles represent nodes within the social network which are not connected. Blue circles represent nodes which are related to one another. The goal of the automated SNA process is to cluster nodes which are related to one another while excluded nodes which are unconnected.

Figure 6:
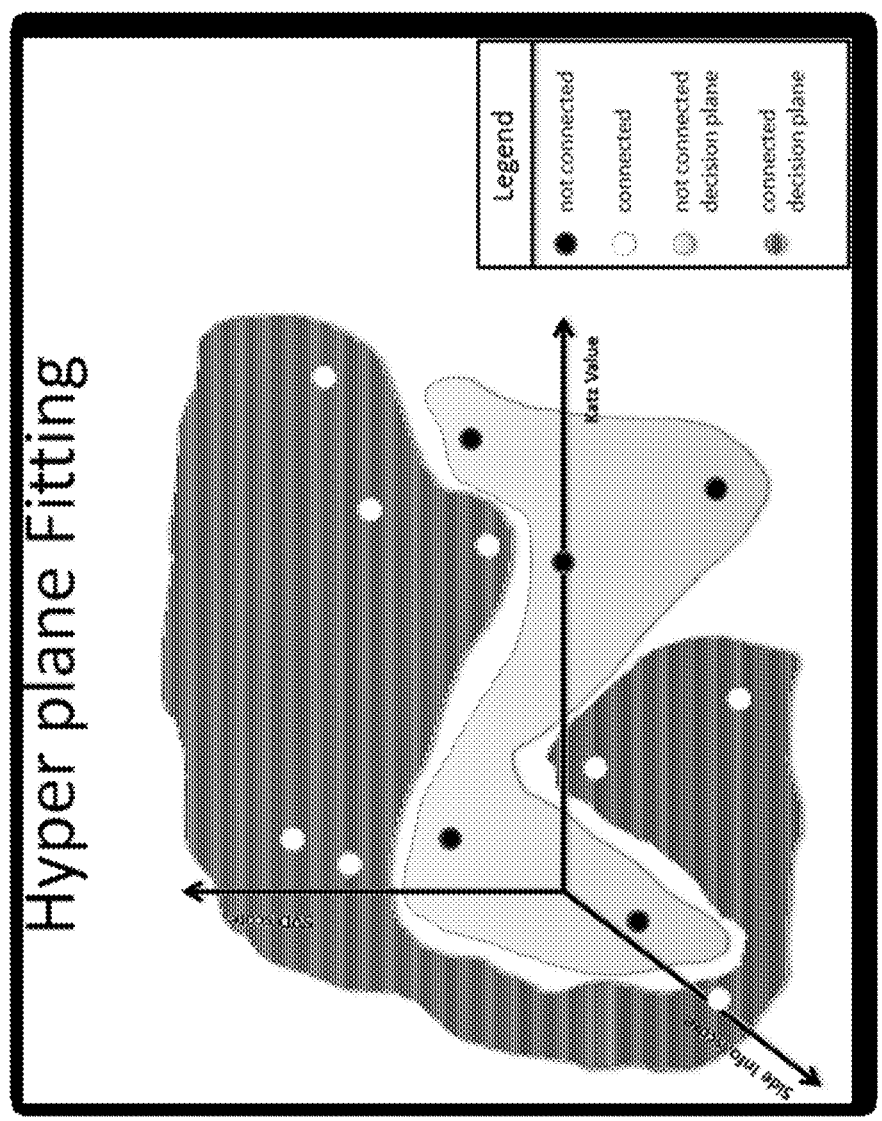
FIG. 6 is a hyperplane fitting of users, i.e., a plurality of nodes in a social network, in accord with one embodiment of the present invention.

With reference to FIG. 6, in one embodiment the multi-dimensional plane is processed using the Vowpal Wabbit algorithm, developed by Yahoo and Microsoft Research, to determine the best fit of each node within a given hyperplane. After processing 108, nodes on the same hyperplane share a relationship with each other.

Figure 7:
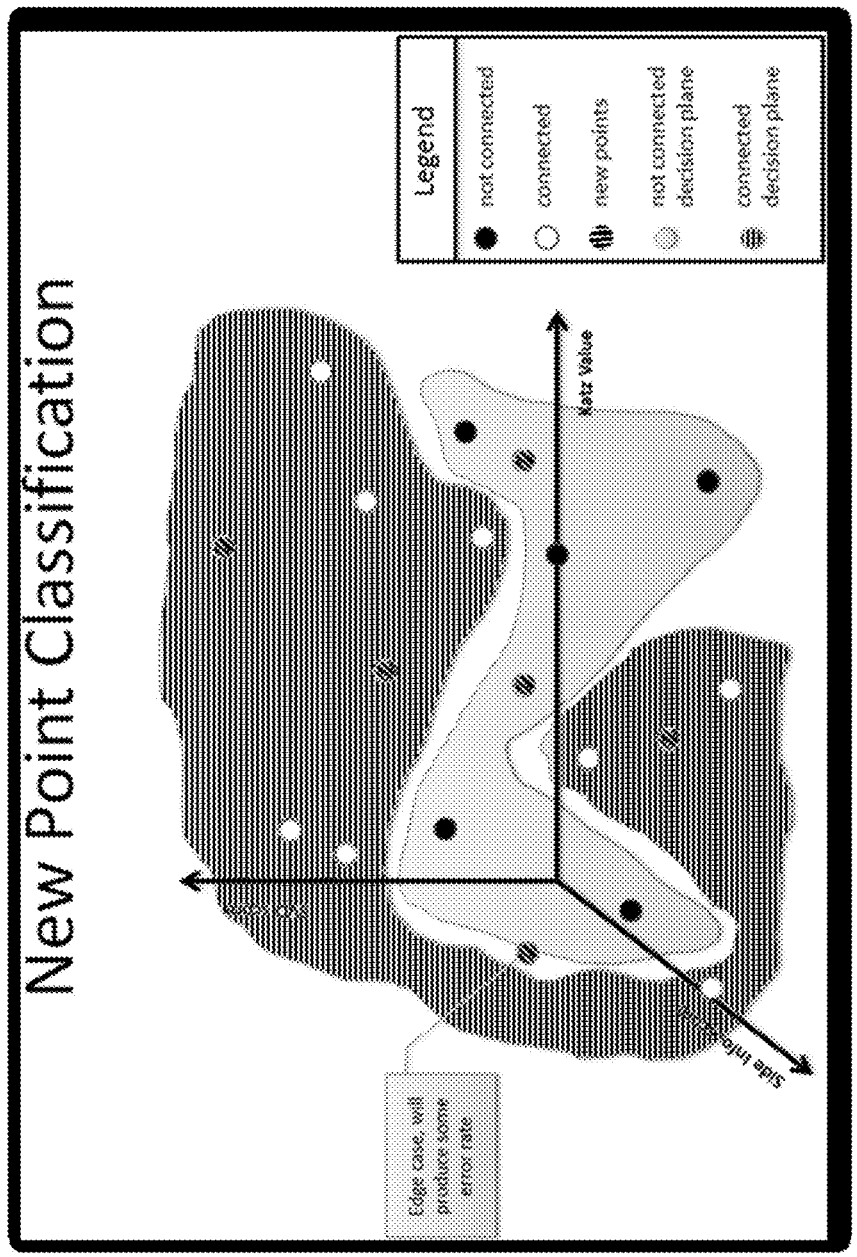
FIG. 7 is a multi-dimensional graph representing the classification of node/user relationships.

As discussed above, embodiments of the present invention permit substantially real time processing of these large, rapidly changing data sets. With reference to FIG. 7, as nodes change (e.g., anytime a user posts to a social media site or new social media users are added) the graph is quickly updated by denoisifying the data set and regrouping the nodes into hyperplanes. Implementation of the SNA solver as a graph calculation problem makes it easy to add new nodes and allows scalability of the solution from a single processor core up to, e.g., a cloud based solution containing hundreds of real or virtual processors.

For example, one embodiment of the present invention uses GraphLab, a parallel processing machine learning architecture designed to be deployed on cloud computing services. Another embodiment of the present invention uses GraphChi on single computers with access to a solid state drive. GraphLab provides speed ups such as asynchronous data messaging and vertex centric modeling not seen in similar parallel distribution architectures such as Hadoop. These speedups are significant and on equivalent machines outperform Hadoop by several orders of magnitude. GraphLab provides this improved performance by assuming that a computing node coincides with a node in the link network instead of, e.g., splitting nodes among processing cores as would occur in some Hadoop implementations.

Figure 8:
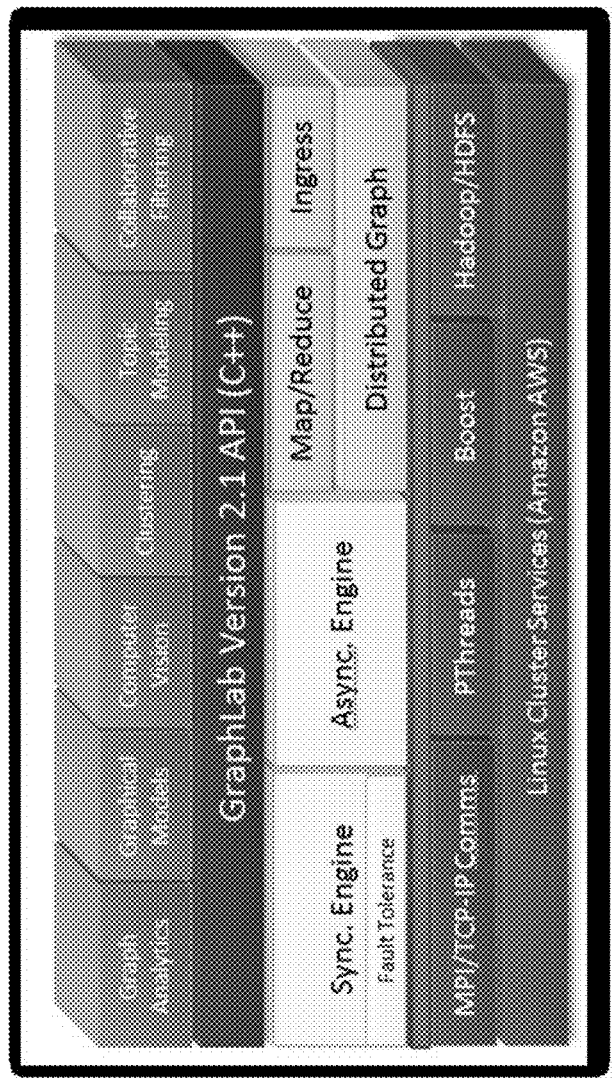
FIG. 8 is a block diagram of the GraphLab architecture.
Figure 9:
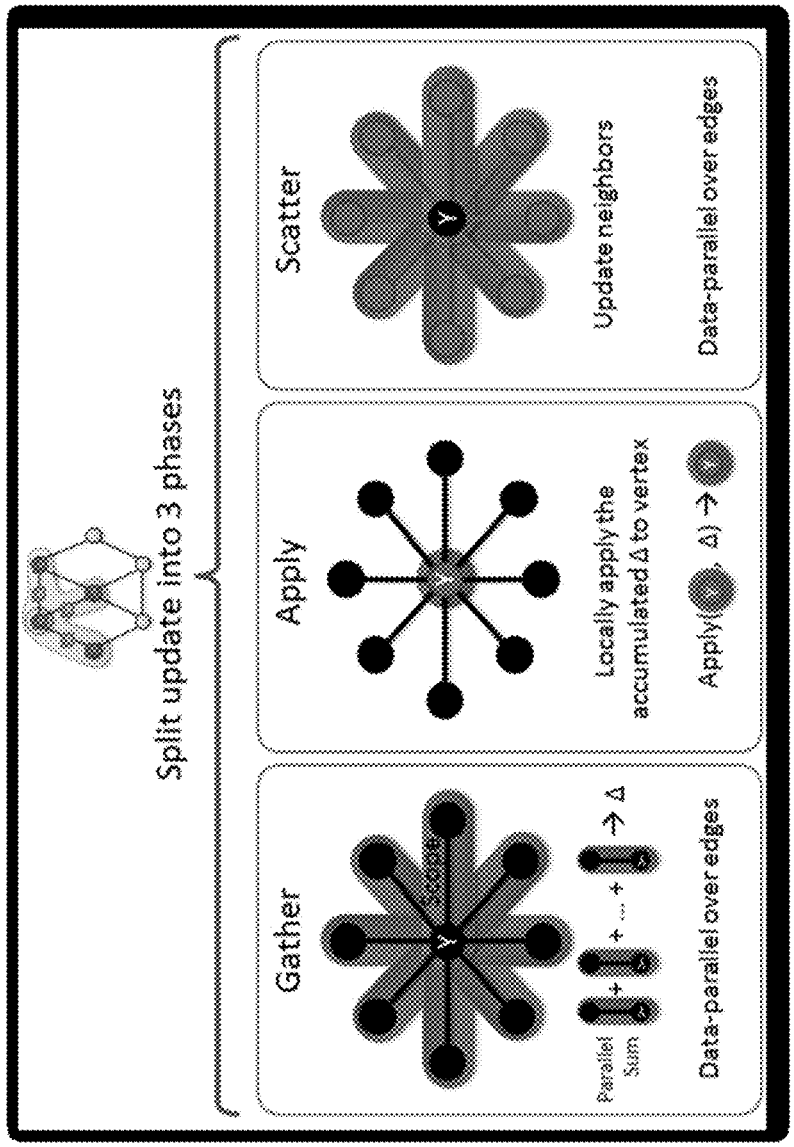
FIG. 9 depicts the GraphLab processing flow based on graph vertexes.

In FIG. 8 the GraphLab API stack is shown, indicating which libraries and what operating systems hooks are available. FIG. 9 presents an example of how a vertex is updated in GraphLab. By taking this vertex-first approach, a reconciliation process in which the calculated edges must be reconnected is not needed. This produces significant performance improvement over baseline parallel frameworks such as Apache Hadoop.

Figure 10:
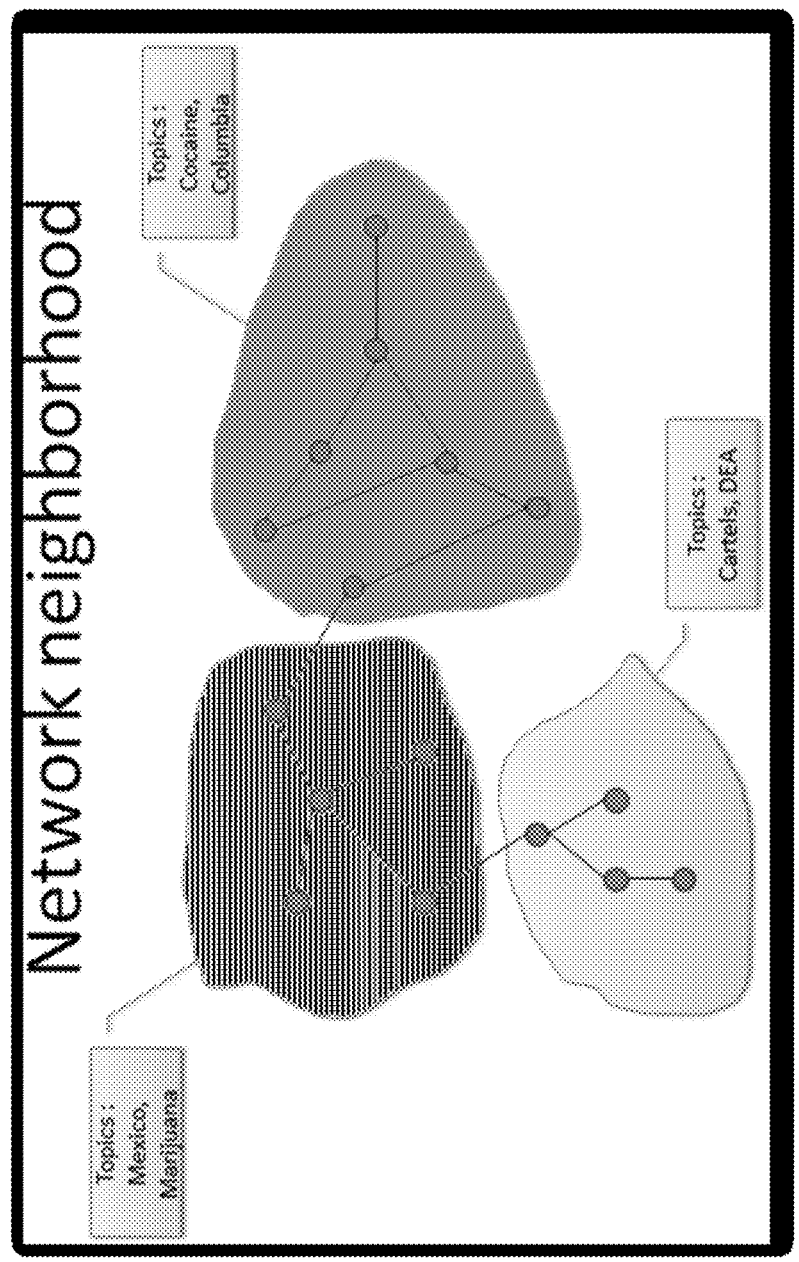
FIG. 10 is a graph showing related nodes and users grouped together by topic.

One output of embodiments of the present invention is a display 324 of groups of related nodes as well as relations between networks of nodes as shown in FIG. 10. The network neighborhood display allows a user to identify which nodes, and therefore users, are more likely to discuss certain topics and allows the user to quickly discover new and interesting connections present in the data.

Embodiments of the present invention also analyze individual nodes in a network to identify their level of influence 112 in the network. In one embodiment, the present invention uses a Modified Decreasing Cascade Model to determine which node has the most influence within a given network. In another embodiment, the present invention uses the PageRank algorithm on various user metrics and statistics (e.g., the length of time it takes for one user to repeat the post of another, the number of users connected to a given user, etc.) to identify the influence of any individual node.

Figure 11:
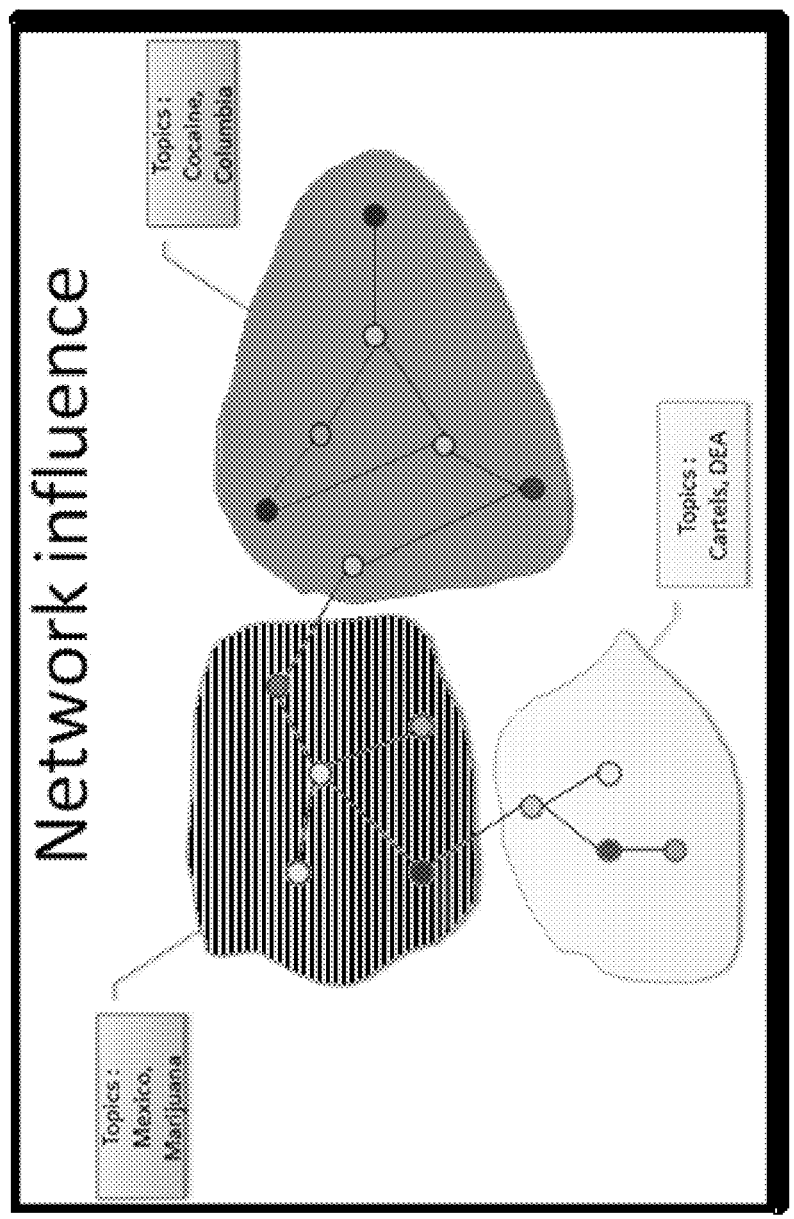
FIG. 11 is a graph showing the relative influence of individual users, i.e., nodes in a social network.

These influence scores allow the user to decide which nodes, and therefore users, should be followed more closely. Influence scores are updateable and amendable by the user; for example, the user can change the weights used to calculate the nodes' influence score and recalculate the influence scores based on this new information. As shown in FIG. 11, color intensity could indicate the relative influence of individuals compared to other members of the same neighborhood.

Figure 12:
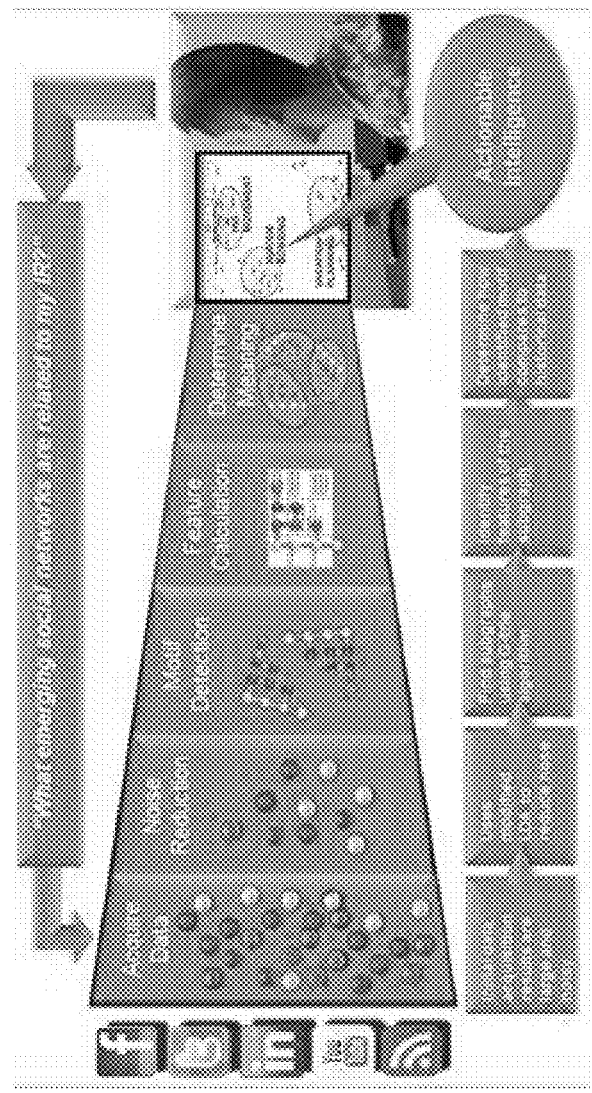
FIG. 12 depicts an example of motif recognition.

FIG. 12 depicts an example of motif recognition. In social network analysis, information is generally collected and processed based on specific information requirements of the user. These requirements serve as a contextual starting point from which network motifs are discovered. Motifs are unique subgraphs or patterns of interconnections occurring in complex networks at significantly higher numbers as compared to random networks. Motif detection in noise reduced data sets is split up into three major elements.

The first element focuses on graph compression using a g-trie data structure. This structure provides maximum data compression and is computationally inexpensive because the algorithm recursively goes through the previously stored graphs and appends the new graph to the end of a similar graph. In this way, a canonical form is calculated such that all graphs have the same format and cannot be counted twice. This canonical search is done by a greedy search and only finds the most optimal branching index such that the data structure is as compressed as much as theoretically possible.

The second element of motif detection determines if the inserted graph is anomalous as compared to all possible graphs. To determine this, a count of all possible canonical representations of the motif must be counted in the original graph. The original counts are then compared against counts in two random network generators. One of them is the Erdos-Renyi Random Graph model and the other is the Watts-Strogatz Small World Model. The resulting random networks are equal in size to the original graph and then motif instances are counted in each of these random networks. These count comparisons directly influence the potential Fisher distribution score calculated for significance of the graphs. The further the Fisher score is away from zero, the higher the likelihood that the motif is significant. The Fisher score allows users to adjust result size based on motif significance. This parameter provides the ability to include some domain or side information into the calculation to further narrow final motif result set.

The final element of motif recognition improves overall calculation speeds. The performance gain is through the use of symmetry breaking conditions introduced to avoid redundant calculations of significance. This addition determines if the motif has been seen before in the graph by examining both graphs from their respective canonical representations. This prevents the doubling seen in the mFinder and FanMod algorithms.

There is a significant capability advantage to this approach because it allows for discovery of much larger motifs which is a limitation of other motif finding approaches. The motifs found by the g-trie algorithm represent the building blocks of our solution. This solution can be applied to Twitter data feeds and various challenge problems. One exemplary application is to predict box office rankings for a given set of movies and over specified time period. A second application is to predict the end of month change for select common stocks. Both applications proved successful with predictions matching real world outcomes.

Figure 13:
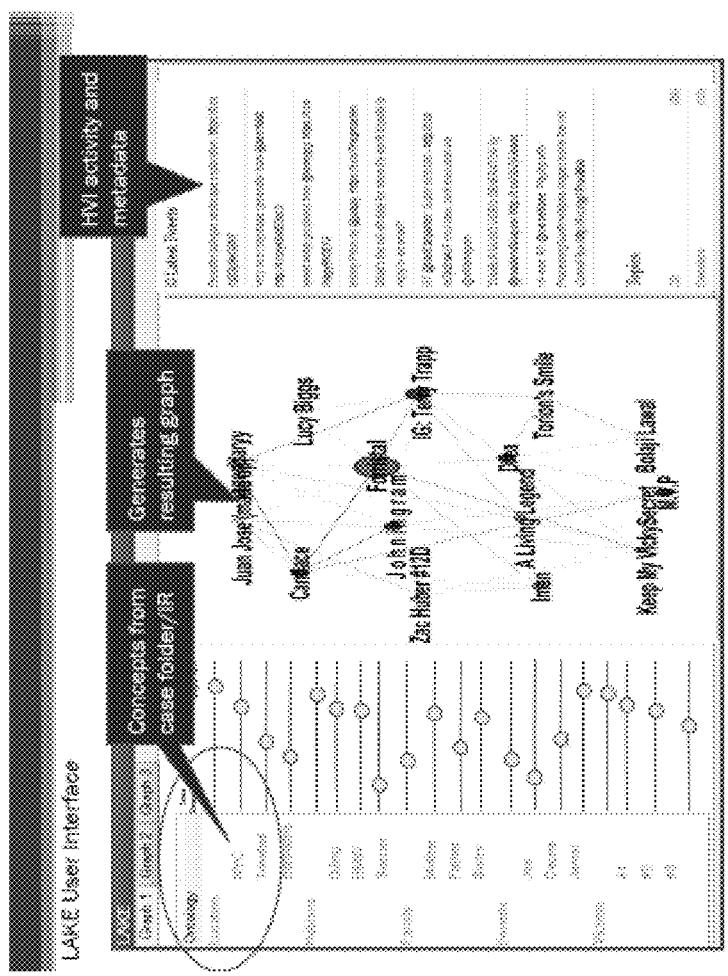
FIG. 13 is a depiction of an exemplary user interface for the noise reduction process.

FIG. 13 depicts how a user interacts with an embodiment of the present invention. The user interface shown guides the user through noise reduction process starting from the left and moving right with ever increasing relevancy. The left side of the user interface shows concepts (ontology) used to filter and guide the noise reduction. Moving right in the user interface, sliders allow the user to specify the relative importance of concepts. The center graph is the result of the noise reduction process and criteria specified by the user. The right most area in the user interface is displayed when the user selects a node in the graph. This area displays detailed information about the node such as user name, recent tweets and topics, etc. Users can create and interact with multiple graphs concurrently as indicated by the tabbed panes within the user interface. Each graph can be interrelated by nodes which appear in multiple graphs.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A method of classifying at least one social media user, the method comprising:
   detecting at least one statistically significant subgraph in a social media network of the social media user, wherein the at least one detected subgraph occurs in significantly higher numbers as compared to random networks;
   gathering data related to metadata of the social media user;
   gathering data related to social interactions of the social media user;
   computing features of:
      the subgraph in the social media network of the user,
      the data related to the metadata of the user, and
      the data related to the social interactions of the user;
   normalizing each computed feature on a zero to one scale;
   aggregating each normalized feature into a numeric vector; and
   comparing the numeric vector of the normalized subgraph features, normalized user metadata, and normalized social interactions to at least one model vector, wherein the at least one model vector is representative of a class; and classifying the user as a class member based on the comparison of the numeric vector and the at least one model vector.

2. The method of claim 1, further comprising training a classification model using a training vector.

3. The method of claim 2, further comprising classifying, using the classification model, at least one other user associated with a new numeric vector.

4. An apparatus for performing the method of claim 1.

5. The method of claim 1 wherein detecting the at least one subgraph in the social media network of the social media user comprises:

compressing an uncompressed graph from a set of graphs derived from a collection of noise reduced data resulting in a compressed graph;

counting the canonical representations of the compressed graph in the set of graphs to yield a first count;

generating a reference graph from the noise reduced data, the reference graph being equal in size to the uncompressed graph;

counting the canonical representations of the compressed graph in the reference graph to yield a second count; and computing distribution score utilizing at least the first count and the second count to determine the significance of the compressed graph.

6. The method of claim 5, wherein compressing an uncompressed graph from the set of graphs comprises compressing the uncompressed graph using a g-trie data structure.

7. The method of claim 5, wherein the reference graph is a random graph or another uncompressed graph from the set of graphs.

8. The method of claim 5, wherein the canonical representation of the compressed graph is a vector form.

9. The method of claim 5, wherein counting the canonical representations of the compressed graph in the set of graphs to yield a first count comprises counting the canonical representations in a set of previously stored graphs.

10. The method of claim 5, wherein counting the canonical representations of the compressed graph in the random graph to yield the second count comprises counting the canonical representations of the compressed graph in one or more of an Endos-Renyi network and a Watts-Strogatz network.

11. The method of claim 5, further comprising classifying at least one individual user or at least one event based on the distribution score.

12. The method of claim 5, wherein the data is based on at least one of a user's actions over a period of time or a set of a user's most recent actions.

13. The method of claim 5, further comprising forming a canonical representation using a greedy search.

14. The method of claim 5, wherein compressing an uncompressed graph from the set of graphs comprises compressing an uncompressed graph from the set of graphs to a size of 4.

* * * * *